May 23, 1967
C. W. OTTO
3,320,660
METHODS FOR ASSEMBLING END SHIELD MEMBERS
IN DYNAMOELECTRIC MACHINES
Original Filed Dec. 11, 1962
2 Sheets-Sheet 1
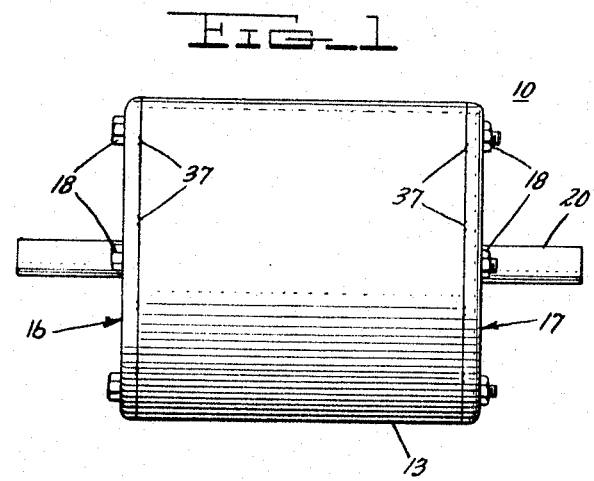
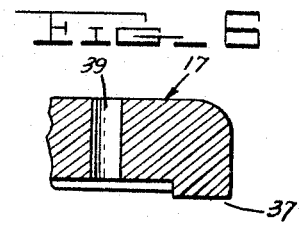
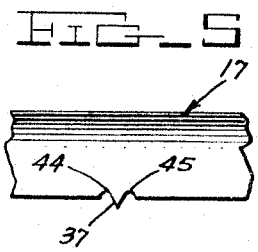
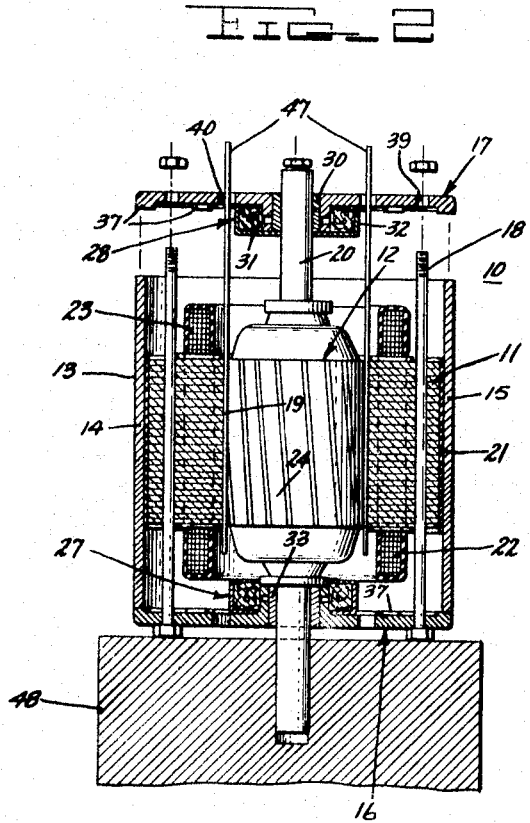
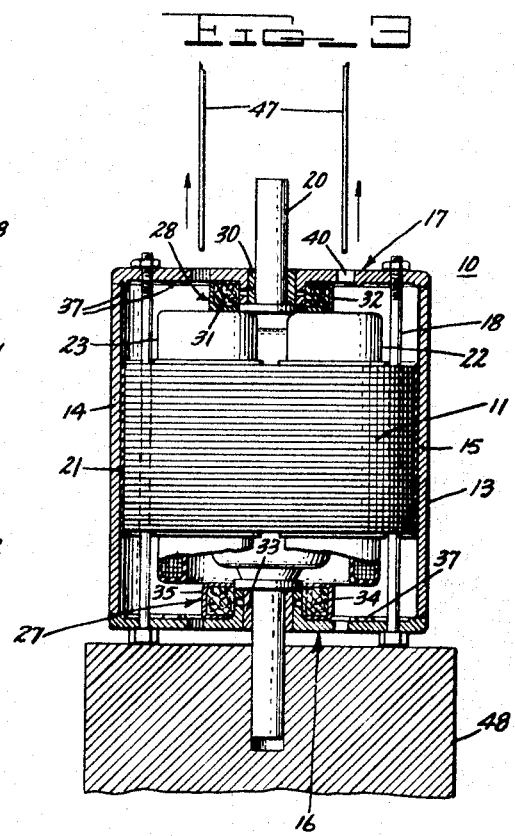
INVENTOR.
Charles W. Otto,
by John M. Steudt
Attorney.

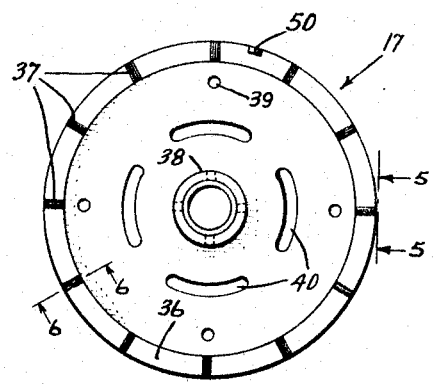
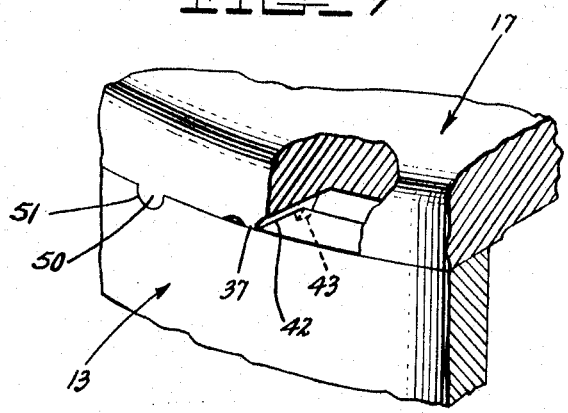

United States Patent Office 3,320,660
Patented May 23, 1967

3,320,660
METHODS FOR ASSEMBLING END SHIELD MEMBERS IN DYNAMOELECTRIC MACHINES
Charles W. Otto, De Kalb, Ill., assignor to General Electric Company, a corporation of New York
Original application Dec. 11, 1962, Ser. No. 243,903. Divided and this application May 24, 1965, Ser. No. 458,188
4 Claims. (Cl. 29—155.5)

This application is a division of my co-pending application Ser. No. 243,903, filed Dec. 11, 1962, now abandoned. This invention relates to methods for assembling end shield members in dynamoelectric machines. More particularly, it relates to an improved method for assembling end shield members in a close radial fit with the frame or shell member of dynamoelectric machines.

In the manufacture of dynamoelectric machines, such as fractional horsepower motors, an end shield member is generally assembled at each end of the frame or shell member which houses the stator of the dynamoelectric machine. Usually, the rotor of the dynamoelectric machine is rotatably supported by bearing means mounted in the end shield members.

For proper performance of a dynamoelectric machine, it is required that the radial dimensions of the air gap between the stator and the rotor be maintained within relatively close tolerances. Since the radial positioning of the rotor is dependent upon the fit between the frame member and the end shield member, it is important that the end shield members be assembled in a true predetermined relationship with respect to the frame member. Further, it is desirable that the end shield members be readily disassembled for the purpose of maintenance and inspection and be readily reassembled.

It has been a practice in the past, particularly in the manufacture of fractional horsepower motors, to provide die cast end shield members that are adapted for a close fit with the frame member. In such constructions the end shield members are formed with a continuous rabbet or an interrupted rabbet which engages the inner surface of the frame member. With such conventional end shield member arrangements difficulties have been encountered in achieving true concentricity between the end shield member and the frame member where the frame member is not truly concentric. It is desirable therefore to provide an end shield arrangement wherein the end shield member can be readily assembled in proper radial relationship with the frame member even though the frame member is not truly concentric. Further, it is desirable to provide a construction and a method of assembling the end shield members with the frame member of a dynamoelectric machine wherein the end shield members can be economically and readily assembled to provide the desired relative radial positioning of the rotor with respect to the stator.

Accordingly, it is an object of this invention to provide an improved end shield member for a dynamoelectric machine.

Another object of the invention is the provision of an improved method of assembling end shield members on the frame or shell members of dynamoelectric machines which will permit the air gap between the rotor and the stator to be maintained within predetermined tolerances.

It is a further object of the invention to provide an end shield member arrangement in which the number of parts are kept at a minimum and in which the assembly operations are economically carried out.

Another object of the present invention is to provide an improved construction of end shield members which can be arranged in proper radial position with respect to the frame member irrespective of slight eccentricities in the frame or shell member of the dynamoelectric machine.

In accordance with one form of my invention, I have provided an improved method for assembling end shield members on dynamoelectric machines having a stationary frame member, a stator and a rotor, and the end shield members that include a rotor supporting means for rotatably supporting the rotor. The rotor and the stator of the dynamoelectric machine are first assembled in predetermined concentric relationship with a means for temporarily maintaining the stator and rotor in the desired predetermined concentric relationship. The end shield members are initially positioned in preassembled relation with the stationary frame member. Preferably, the end shield members are formed with a plurality of circumferentially spaced fin-shaped axially extending deformable projections. The end shield members are then assembled with the frame member under pressure so that a portion of each of the fin-shaped projections is deformed to thereby join the end shield member and the frame member in axial contact and also to form nondeformed portions on said projections that serve as tangs to maintain the radial position of the end shield member with respect to the frame member. The means for temporarily maintaining the concentric relationship of the stator and rotor is then removed in order to release the stator and rotor for relative rotation. Accordingly, by this method of assembly, it is possible to assemble the end shield members in proper radial alignment with respect to the frame member even though the main frame member is not truly concentric.

The subject matter which I regard as my invention is set forth in the appended claims. The invention itself, however, together with further objects and advantages thereof may be better understood by referring to the following description taken in conjunction with the accompanying drawings in which:

FIGURE 1 is a side elevational view of a motor in which the end shield members are shown in final assembled relation with the main frame member after the motor has been assembled by the preferred embodiment of the present invention;

FIGURE 2 is a sectional view of the motor shown in an assembly fixture with one of the end shield members shown in position for assembly with the frame member and the other end shield member shown in an exploded view;

FIGURE 3 is a sectional view of the motor shown in an assembly fixture corresponding to the view shown in FIGURE 2 and illustrating the end shield members in final assembled relation with the main frame member;

FIGURE 4 shows an end view of an end shield member showing the fin-shaped projections formed on the face near the periphery of the end shield member;

FIGURE 5 shows an enlarged fragmentary view taken along line 5—5 of the end shield member shown in FIGURE 4;

FIGURE 6 is an enlarged fragmentary view of a section taken along line 6—6 as shown in FIGURE 4; and FIGURE 7 is an enlarged fragmentary view in perspective of a deformed projection illustrating how the portion of the projection that is deformed brings the end shield member in axial contact with the frame member and how the nondeformed portion forms a tang in radial abutment with the main frame member.

Referring now more particularly to FIGURES 1, 2 and 3, I have illustrated therein an induction motor 10 of the fractional horsepower frame size assembled by the preferred embodiment of the invention. The induction motor 10 includes a stator 11 and a rotor 12 which are assembled for relative rotation within a motor housing means which includes a frame or shell member 13 and includes a pair of end shield members 16, 17 which are held in assembled arrangement with the frame member 13 by four through-bolts 18. The stator 11 is provided with appropriate field exciting windings 22, 23.

The stator 11 is provided with an accurately dimensioned inner bore 19. The rotor 12 is concentrically mounted on a shaft 20 and fixed securely for rotation therewith by any suitable means. As shown, the rotor 12 is disposed coaxially within the stator bore 19 for relative rotation with respect to the stator 11. The stator 11 was bonded to the stationary frame or shell member 13 by means of a bonding material 21, which preferably may be a cured epoxy resin. The bonding material 21 retains the frame member 13 in a fixed relationship with respect to the stator 11. The frame member 13 may be press-fitted or welded to the stator 11, if desired.

As is shown in FIGURE 2, the rotor 12 has a standard squirrel-cage type winding which includes a plurality of equally spaced conductors 24 extending along the axial length of the rotor 12. The end shield members 16, 17 are joined in axial contact at the ends of the frame member 13 and support the bearing assemblies 27, 28. Since the rotor shaft 20 is rotatably carried by the bearing assemblies 27, 28, it will be understood that the radial position of the end shield members 16, 17 with respect to the frame member 13 determines the coaxial relationship between the rotor 12 and the stator 11. Consequently, if the gap between the rotor 12 and the stator 11 is to be held within specified tolerances, it is important that the radial position of the end shield members 16, 17 with respect to the frame member 13 be effectively maintained.

As shown in FIGURES 2 and 3, the upper bearing assembly 28 includes a bearing 30, an oil impregnated felt member 31 and a bearing housing 32. Suitable passageways are provided between the felt member 31 and the bearing 30 to allow for the flow of lubricant to the bearing 30. The inner end face of the bearing 30 serves as a thrust bearing means. The lower bearing assembly 27 is similar in construction and is comprised of a bearing 33, an oil impregated felt member 34 and a bearing housing 35.

Referring now more specifically to FIGURES 4, 5 and 6, it will be seen that an inner annular face 36 of the end shield member 17 is provided with a plurality of fin-shaped projections 37. The fin-shaped projections 37 are circumferentially spaced and extend outwardly in an axial direction.

The end shield member 17 is formed with a central collar 38 adapted to receive the bearing assembly 28 and the holes 39 for the through-bolts. Four ventilating ports 40 are formed to allow air to circulate through the interior of the motor 10, and as will hereinafter be more fully described, permit the shims to be removed after the end shield members 16, 17 are assembled on the frame member 13 in accordance with the invention. End shield member 16 used in the exemplification of the invention is identical in construction to end shield member 17, and prior to assembly is interchangeable with end shield member 17. Accordingly, the structural features of end shield member 16 will not be described in detail.

The end shield members 16, 17 used in the exemplification of the invention, were die cast of a suitable deformable material, such as aluminum. As will be seen in FIGURE 7, a portion 42 of the projection 37 is deformed where the end shield member 17 is joined in axial contact with the frame member 13. It will be seen that the nondeformed portion 43 of the projection 37 forms a tang or an interrupted rabbet that is in radial abutment with the inner surface of the frame member 13 and thereby fixes the radial position of the end shield member 17 with respect to the frame member 13. An important advantage of this arrangement is that the end shield members 16, 17 are accurately positioned even though a certain amount of eccentricity may be present in the cylindrical opening of the frame member 13.

In order to insure that the end shield member 17 is reassembled in proper circumferential alignment with the frame member 13 after the projections 37 are initially deformed, a lug 50 is provided on the end shield member 17 and engages a notch 51 formed on the frame member 13.

In order to insure that the portion 42 of the projection 37 will readily deform so that the end shield member 17 can be joined in axial contact with end shield member 13, a pair of indentations 44, 45 as shown in FIGURE 5, are provided, on each side of projection 37 so that the displaced material can flow into the indentations 44, 45 and not interfere with the fit between the frame member 13 and the end shield member 17.

Referring again to FIGURES 2 and 3, the method of assembling the end shield members 16, 17 will now be more fully described. Before the assembly of the end shield members 16, 17 was undertaken, the portions 14, 15 of the frame member 13 were bonded to the stator 11 by a suitable bonding means 21, such as an epoxy resin. The stator 11 and rotor 12 are assembled temporarily in predetermined coaxial relationship by means of four shims 47 which were placed between the stator 11 and rotor 12 so as to maintain the desired air gap during the subsequent assembly steps.

As is shown in FIGURE 2, the end shield member 16 and the through-bolts 18 disposed in preassembled relation therewith are placed in a suitable assembly fixture 48. The end shield member 17 is also placed in preassembled relation with the frame member 13 by allowing the shims to pass through the ventilating ports 40 and the through-bolts 18 to pass through the holes 39. When end shield members 16, 17 are in the preassembled position, it will be understood that the projections 37 on the end shield members 16, 17 are not deformed and that the bearing assemblies 27, 28 engage the shaft 20 to position the end shield members 16, 17 on the frame member 13.

Although in the illustrated exemplification of the invention, the coaxial relationship between the rotor 12 and stator 11 was temporarily maintained by the use of metallic shims 47, it will be appreciated that other suitable means may be used for maintaining the desired coxial relationship between the rotor 12 and stator 11. For example, a suitable jig or a shim means comprised of volatile material may be used.

After the end shield members 16, 17 are disposed in preassembled relation with respect to the frame member 13, the deforming step may now be carried out. In the exemplification of the invention, the compressive force required to deform the portions of the projections 37 was obtained by tightening the nuts of the through-bolts 18. It will be appreciated that in dynamoelectric machines where through-bolts are not used or where it is not practicable to use the through-bolts to effect the deformation of the projections 37, the deforming step may be carried out by placing the motor assembly in a press or other device and applying sufficient compressive force to the end shield members 16, 17 to achieve the desired deformation of the projections 37.

The next step in the assembly operation involves removing the shims 47. The shims 47 are removed by pulling them out through the ventilating ports 40 of the end shield member 17. With the shims 47 removed, the alignment of the rotor 12 is now maintained by the interrupted rabbet or the tangs formed by the nondeformed portions of the projections 37, and the rotor 12 is freed for relative rotation with respect to the stator 11. The end shield members 16, 17 can be freely disassembled and reassembled providing the circumferential alignment of the end shield members 16, 17 with respect to the frame member 13 is maintained. Proper circumferential alignment of the end shield members 16, 17 is insured by a notch and lug arrangement. As shown in FIGURE 7, in order to properly reassemble the end shield member 17 the lug 50 formed on the end shield member 17 must engage the notch 51 formed on the frame member 13.

It will be apparent from the foregoing description of the construction of the end shield arrangement, and assembly steps the accurate control of the concentricity between the rotor and stator of a dynamoelectric machine such as a motor, may be achieved. An important advantage of the deformed projection arrangement of the invention is that the accurate control of the concentricity does not depend upon holding the dimensions of the stator member or the end shield members within close tolerances. The end shield members of a dynamoelectric machine may be truly centered with respect to the frame member even where the frame member is eccentric relative to the axis of the rotor. Moreover, since the tolerances for manufacturing the frame member and end shield members do not have to be kept within close limits, these parts may be more economically manufactured.

While I have illustrated and described a specific embodiment of the invention, it is to be understood that numerous modifications can be made by those skilled in the art without actually departing from the invention. For example, it will be apparent the deformable fin-shaped projections may be formed on the frame member of the dynamoelectric machine. In such an arrangement the nondeformed portions of the projections on the frame member will serve as tangs to maintain the relative radial position of the end shield members. It is, therefore, intended in the appended claims to cover such equivalent variations as come within the true spirit and scope of the invention.

What I claim as new and desire to secure by Letters Patent of the United States is:

1. A method of assembling an end shield member on a dynamoelectric machine having a stator member supported in a stationary frame member, said stator member having a stator formed with a cylindrical bore adapted to receive a rotor having a shaft, said method comprising the steps of: assembling the rotor and stator member in a predetermined coaxial relationship with a means for temporarily maintaining said rotor and stator member in the predetermined coaxial relationship, placing the end shield member on the rotor shaft in position for assembly with respect to the stationary frame member, said end shield member including a bearing means for rotatably supporting the rotor and said end shield member being formed with a plurality of axially extending projections of a material deformable relative to the frame member, the projections being circumferentially spaced around the outer periphery of said end shield member to be joined with said frame member, and extending inwardly beyond the radial face of said frame member pressing said end shield member against the radial face of said stationary frame member to join said end shield member in axial contact with said frame member and thereby simultaneously deforming a portion of each of said projections to define tangs to maintain the radial alignment of said end shield member with respect to said stationary frame member, and removing said means for temporarily maintaining the coaxial relationship between said rotor and said stator to thereby release the stator and rotor for relative rotation.

2. A method of assembling end shield members on a dynamoelectric machine having a stationary frame member, a stator and a rotor, said end shield members including a rotor supporting means having bearings for rotatably supporting the rotor, and said stator being fixedly supported in the stationary frame member, each said member having a radial face, said method comprising the steps of: assembling the rotor and stator with a means for temporarily maintaining the predetermined concentric relationship between the rotor and the stator; using the rotor to locate the radial position of the end shield with respect to the stationary frame member positioning the end shield members in preassembled relation with the stationary frame member, one of said members having a plurality of circumferentially spaced projections extending axially from its radical face and also extending in a radial direction beyond the radial face of said other member, said projections being of relatively deformable material with respect to said other member, assembling the end shield members under pressure into axial contact and in assembled relation with said frame member to cause a portion of each of said projections to deform thereby joining said end shield members and said frame member in axial contact and providing nondeformed portions on said projections, said nondeformed portions serving as tangs to maintain the radial position of said end shield members with respect to said frame member; and removing said means for temporarily maintaining the concentric relationship to release said stator and rotor for relative rotation.

3. A method of assembling an end shield member on a motor having stator, a rotor, and a rotor supporting means including bearings for rotatably supporting said rotor in said stator, said rotor supporting means being carried in a stationary frame member having a frame face, said method comprising the steps of: assembling said rotor and stator in predetermined concentric relation with shim means disposed in the air gap between the stator and rotor, using the rotor to locate the radial position of the end shield with respect to said stationary member positioning the end shield member in preassembled relation with the frame member and said rotor, said end shield member being formed of deformable material relative to said frame member and including a plurality of axially extending projections extending radially beyond the frame face, joining said end shield members and said frame member in assembled relation under pressure to deform a portion of each of said axially extending projections to leave thereon a plurality of non-deformed portions of said projections for maintaining the radial position of said end shield members, the deformed portion providing an axial contact between said end shield member and said frame face, and removing said shim means to release the stator and rotor for relative rotation.

4. A method of assembling a pair of end shield members on a stationary frame member of a dynamoelectric machine having a stator supported in said stationary frame member, a rotor and a rotor supporting means for rotatably supporting said rotor, said rotor supporting means being caried by said end shield members and said end shield members being assembled with said frame member by through-bolts, said method comprising the steps of: assembling said rotor and said stator in predetermined spaced relationship with a temporary positioning means to maintain the rotor and stator in said predetermined spaced relationship, placing said end shield members on said rotor supporting means thereby to arrange said end shield members in preassembled relation with said frame member, one of said members being formed with a plurality of circumferentially spaced projections composed of a relatively deformable material with respect to the other of said members and extending radially beyond an axially extending surface of the frame member, using said through-bolts to draw said end shield members in assembled relation in axial contact with said frame member to deform a portion of said projections and thereby to define an interrupted rabbet for maintaining the radial position of said end shield members with respect to said stationary frame member, the deformed portion providing an axial contact between said end shield member and the axially extending surface of said frame member, and removing said positioning means to release said stator and rotor for relative rotation.

References Cited by the Examiner

UNITED STATES PATENTS

| | | |
|---|---|---|
| 2,306,233 | 12/1942 | Smith. |
| 2,781,165 | 2/1957 | Troller 29—155.5 XR |
| 3,045,137 | 7/1962 | Simmons et al. 310—258 |
| 3,077,030 | 2/1963 | Carlson 29—432 XR |
| 3,165,816 | 1/1965 | Thompson et al. 29—155.5 |

JOHN F. CAMPBELL, *Primary Examiner.*

JOHN L. CLINE, R. W. CHURCH, *Assistant Examiners.*